No. 720,755. PATENTED FEB. 17, 1903.
S. TIMOKHOVITSCH.
VENTILATION OF ROOMS OR BUILDINGS.
APPLICATION FILED MAY 2, 1901.
NO MODEL. 3 SHEETS—SHEET 1.
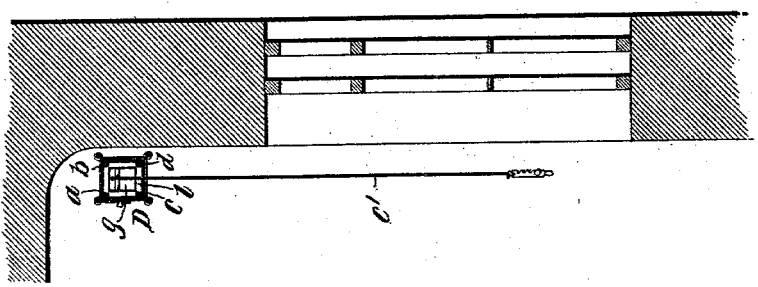
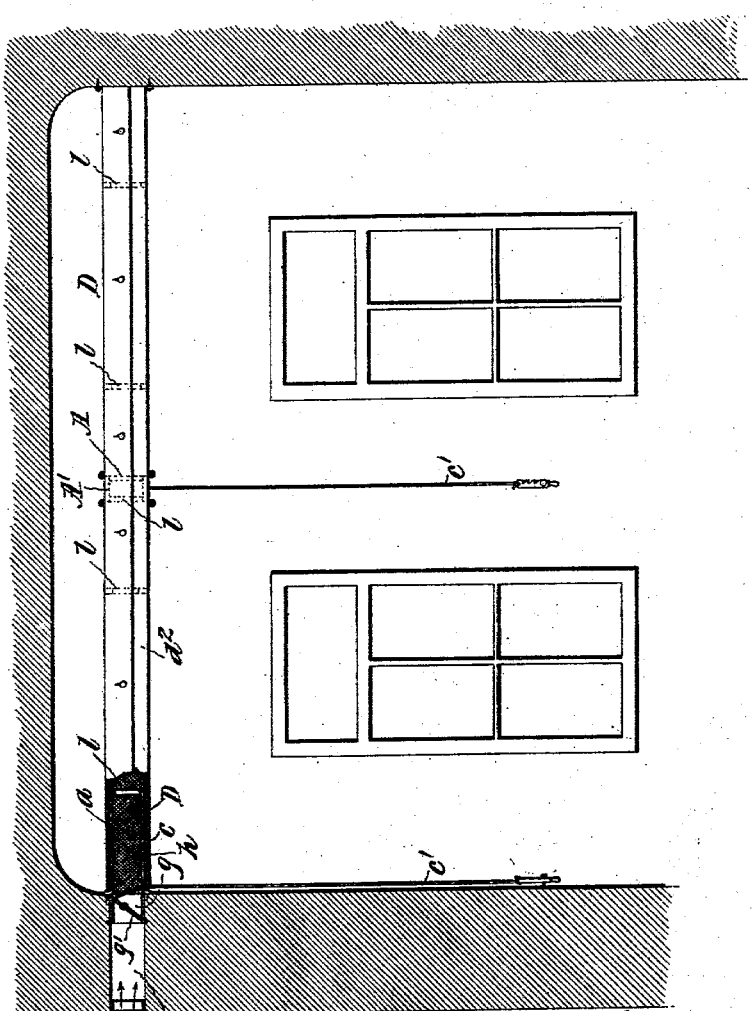

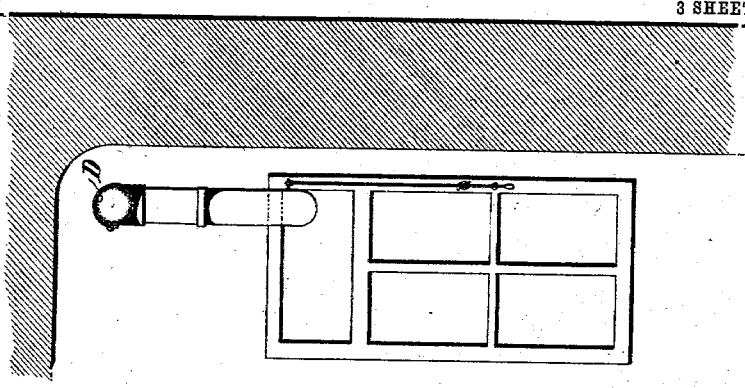
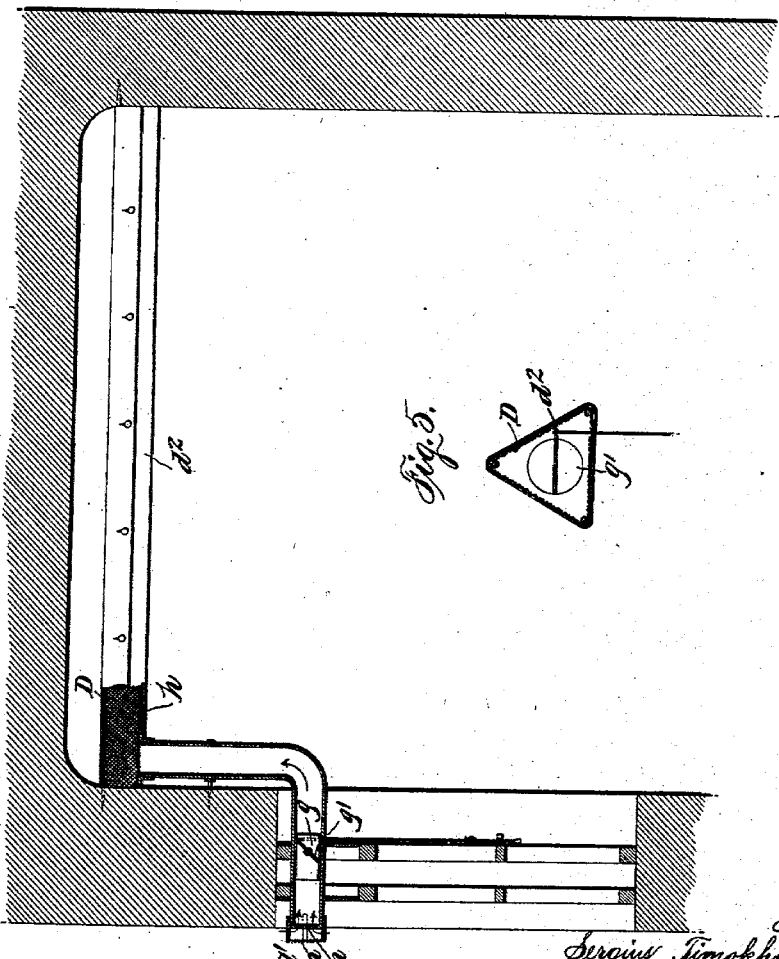

No. 720,755. PATENTED FEB. 17, 1903.
S. TIMOKHOVITSCH.
VENTILATION OF ROOMS OR BUILDINGS.
APPLICATION FILED MAY 2, 1901.
NO MODEL. 3 SHEETS—SHEET 3.
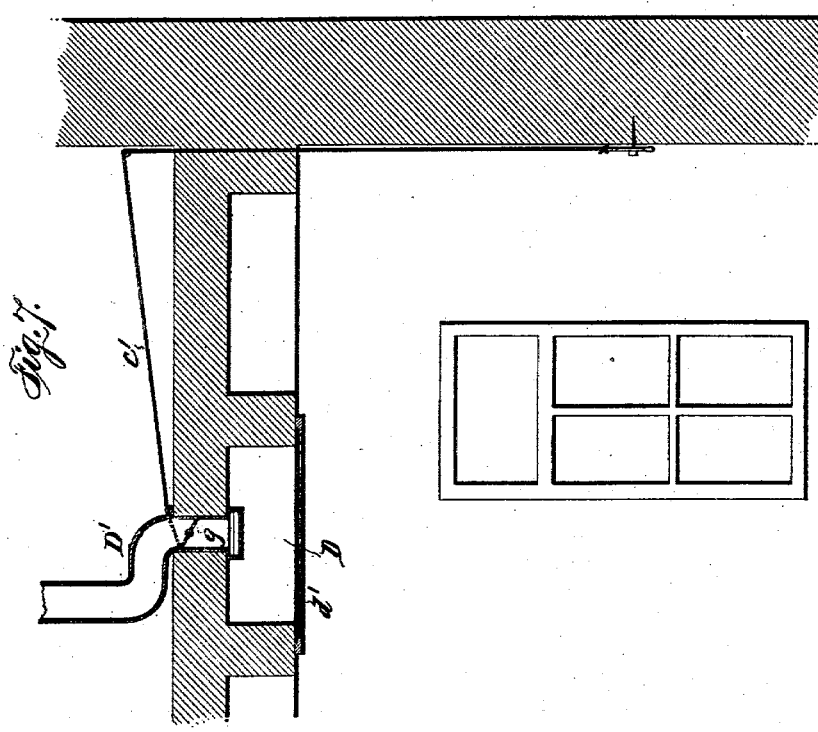
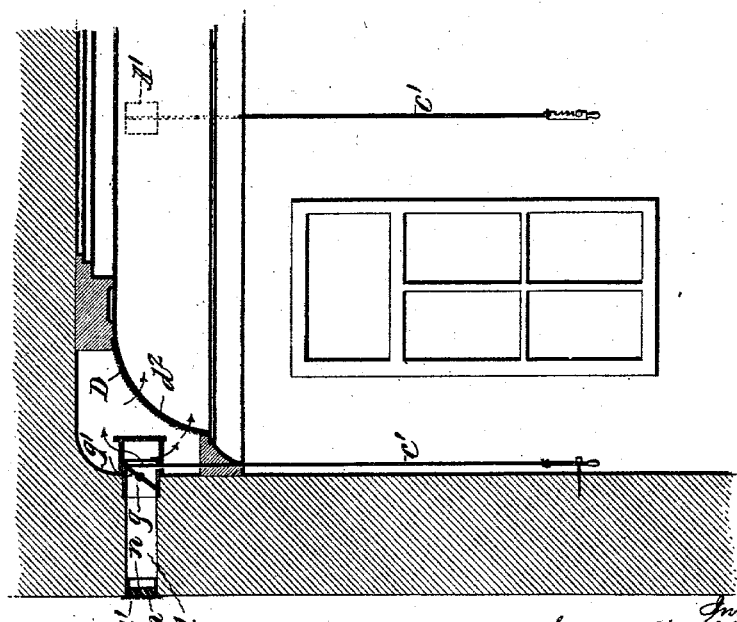
Witnesses:
Inventor,
Sergius Timokhovitsch.

UNITED STATES PATENT OFFICE.

SERGIUS TIMOKHOVITSCH, OF MOSCOW, RUSSIA.

VENTILATION OF ROOMS OR BUILDINGS.

SPECIFICATION forming part of Letters Patent No. 720,755, dated February 17, 1903.

Application filed May 2, 1901. Serial No. 58,501. (No model.)

*To all whom it may concern:*

Be it known that I, SERGIUS TIMOKHOVITSCH, a subject of the Emperor of Russia, and a resident of Miassnitzkaia 24, Moscow, Russia, have invented certain new and useful Improvements Relating to the Ventilation of Rooms or Buildings, of which the following is a specification.

My invention has relation to the ventilation of inclosed spaces, such as rooms, halls, or other spaces in a building; and it has for its object the provision of means whereby the air supplied from without is filtered before it is distributed in the space to be ventilated.

The invention has for its further object the provision of means for removing the filtering medium from and restoring it to the air distribution.

The invention may be carried into practical effect in various ways, and in order that this may be fully understood I will describe the said invention in detail, reference being had to the accompanying drawings, wherein I have illustrated several modes of carrying it out.

Figure 1 is a fragmentary longitudinal section, and Fig. 2 a similar cross-section illustrating an arrangement for taking in air from the outside through a suitable port and passage in one of the outer walls of a building. Figs. 3 and 4 are views similar to Figs. 1 and 2, respectively, illustrating an arrangement for taking in air through a transom or the like above a window or a double window. Fig. 5 is a cross-section of a modified form of air intake or duct and filter; and Figs. 6 and 7 are fragmentary longitudinal sections illustrating other arrangements for taking in, filtering, and distributing the air.

As shown in Figs. 1 and 2, the air distributing and filtering duct D is arranged close to the ceiling of the room and connected with a passage A in the wall of the building communicating with the atmosphere. The outer end of this passage A is suitably protected against ingress of coarse impurities or birds by a screen $m$ and a grating $n$, and in the inner end of the passage is an open-ended valve-casing $g$, containing a throttle-valve $g'$, controlled by means of a suitable chain or cord $c'$.

The air filtering and distributing duct D is constructed as follows: A skeleton frame is composed of wires—as, for instance, of four wires $a$, $b$, $c$, and $d$, Fig. 2—which are strung through apertures formed at the corners of supporting-frames $l$, which may be made of wood or metal, and arranged at suitable distances apart, the ends of the wires being respectively secured to the valve-casing $g$ and to the opposite wall of the room. On this framing is mounted a filtering medium $d^2$ in the form of a suitable fabric, so that it may be readily removed and replaced for cleansing or for the substitution of a new one when worn, and to this end buttonholes can be provided along one of the meeting edges of the fabric and buttons along the other. In practice I prefer to use a napped fabric, as canton-flannel or similar fabrics, having a rather open-mesh woven body or ground and wind the same on the framework with the smooth back or ground fabric outside, so that the air entering the duct D thus formed will be freed from such impurities as would pass through even very fine perforations of the perforated distributing-pipes, the use of which has been proposed before my invention. I may also cover the framing of the duct D with a more or less open-mesh wire fabric $h$, as shown at the left of Figs. 1 and 3, as a means for preventing the filtering medium from sagging, though this is not absolutely necessary if the wire supporting and bracing frames $l$ are placed sufficiently close together.

If desired, air may be supplied to the air-distributing duct D from more than one point, and in Figs. 1 and 6 I have shown in dotted lines a second valve-controlled air-inlet A' about midway of the length of the filtering and distributing duct D. This duct D may also have a triangular form in cross-section, as shown in Fig. 5, while the air instead of being taken in through one or more of the outer walls of a building may be taken in through a transom above one of the windows or above a double window, as shown in Figs. 3 and 4, or the filtering and distributing duct can be formed in or arranged to form a part of the cornice of a room, as shown in Fig. 6, while said duct or ducts may be formed in the ceiling of a room between one or more joists, as may be necessary, as shown in Fig. 7, wherein D' indicates the air-intake, which may be carried through an outer wall.

Any suitable well-known means may be provided for exhausting the foul air from the rooms supplied with filtered air, as described, and inasmuch as the air passes but slowly through the filtering medium it becomes heated to the temperature of the air in the room, unpleasant or injurious drafts being effectually avoided.

It will of course be understood that in the ventilation of a building the outer air may be taken from any suitable elevation above ground through a suitable duct and forced into the distributing-tubes by means of a suction and forcing device.

Having thus described my invention, what I claim as new therein, and desire to secure by Letters Patent, is—

1. The combination with a room, hall or the like; of an air-intake arranged along the ceiling and comprising a skeleton frame and a more or less loosely woven napped fabric surrounding the support with its napped side turned inwardly, means for admitting fresh air to said intake and means for controlling the admission of such air, for the purpose set forth.

2. The combination with a room, hall or the like, of an air-intake arranged along the ceiling and comprising an open-work support and a more or less loosely woven napped fabric detachably secured to and surrounding the support with the napped side turned inwardly, means for admitting air to the intake and means for controlling the admission of such air, for the purpose set forth.

3. The combination with a room, hall or the like, of an open-work air-intake extending along the ceiling, and a covering for said intake of a more or less loosely woven napped fabric with the napped face turned inwardly, means for admitting fresh air to said intake and means for controlling the admission of such air, for the purpose set forth.

4. The combination with a room, hall or the like, of an air-intake comprising hangers connected to the ceiling, wires strung through the hangers and having their ends secured to opposite walls to form the skeleton frame of a duct, said wires having their terminals secured to opposite walls, a covering for said frame of a more or less loosely woven napped fabric detachably secured to the frame with the napped side turned inwardly, means for admitting fresh air to the intake and means for controlling the admission of such air, for the purpose set forth.

5. An air distributing and filtering duct comprising a skeleton frame, a sheet of a more or less loosely woven napped fabric surrounding the same with its napped side turned inwardly, the two forming a duct, said sheet of fabric detachably united along its meeting edges, for the purposes set forth.

In witness whereof I have hereunto set my hand in presence of two witnesses.

SERGIUS TIMOKHOVITSCH.

Witnesses:
N. TSCHEKALOFF,
H. LOVIAGUINE.